Aug. 28, 1962 P. S. POLLITT 3,050,780
MANUFACTURE OF HAT BLOCKS
Filed July 16, 1959

INVENTOR.
PAUL S. POLLITT
BY
Bierman & Bierman
ATTORNEYS

United States Patent Office 3,050,780
Patented Aug. 28, 1962

3,050,780
MANUFACTURE OF HAT BLOCKS
Paul Stanley Pollitt, Denton, England, assignor to J. Moores & Sons Limited, Denton, Lancashire, England, a British company
Filed July 16, 1959, Ser. No. 827,593
5 Claims. (Cl. 18—34)

This invention concerns the manufacture of hat blocks.

Hat blocks have been made from any materials such as wood, cast iron, and alloys and sometimes they have been perforated to allow steam to pass therethrough during the shaping of a hat. It will be realised that the block has to be exactly matched to its mould, and thus, if made from wood, in many cases has a relatively short useful life since the wood is liable to crack, swell or shrink according to varying conditions of humidity. Metal blocks on the other hand suffer from the disadvantage of high cost, weight and, in the case of cast iron, the ease in which they can be broken by dropping.

A general disadvantage of hat blocks lies in the fact that there are required a large number thereof to correspond to a similar number of hat moulds, in fact a pair for each hat size and style is required and thus the initial cost of purchasing, or manufacturing, by a user is high and replacement often required.

The object of the present invention is to substantially eliminate the above mentioned disadvantages.

According to the present invention apparatus for manufacturing a hat block from fibre glass and a quantity of resin binder comprises a mould, said mould having a first washer-like disc provided with an upwardly directed lip thereon around its inner periphery and adapted to be placed over the open end of the mould, a second washer-like disc having a plurality of radial grooves on the surface adapted to be adjacent the first disc and a bag capable of being placed within the assembled mould and expanded by the use of steam or hot water.

Figure 1:
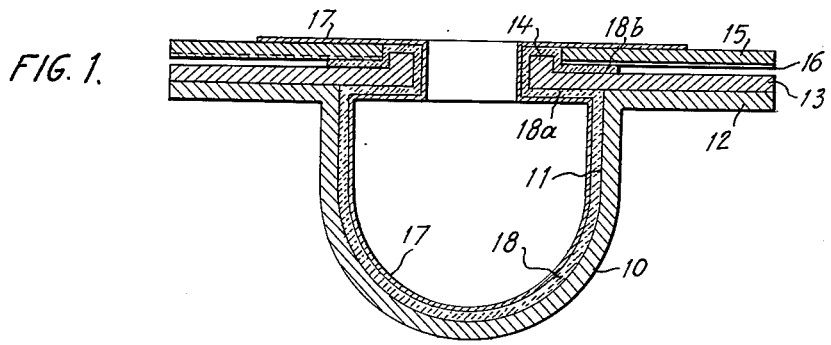
Figure 2:
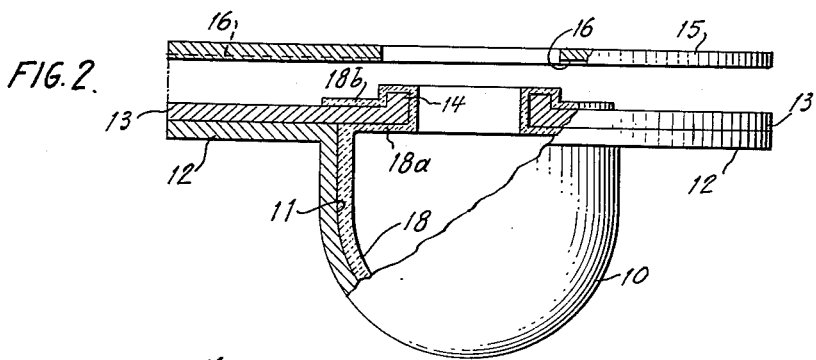
Figure 3:
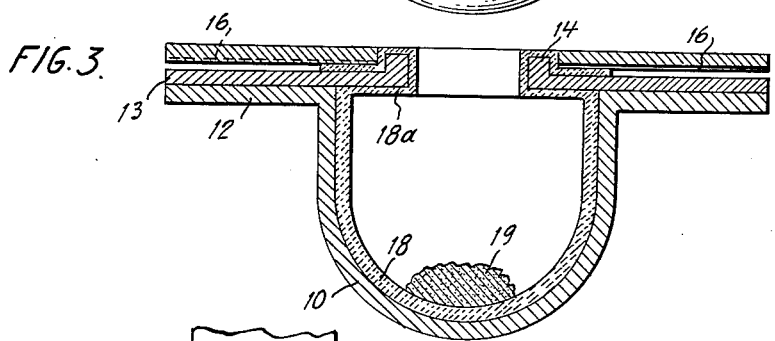
Figure 4:
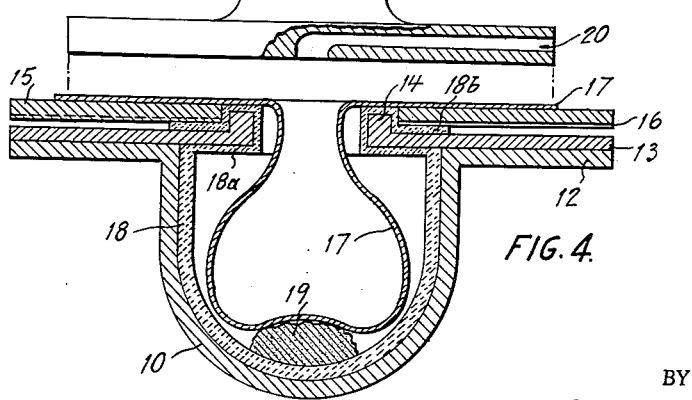

The invention will be described further, by way of example, with reference to the accompanying drawing in which:

FIG. 1 is a diametral cross-sectional view of a mold according to the invention showing the completed hat block at the end of the operation; and FIGS. 2, 3 and 4 are views similar to FIG. 1 showing the successive steps in the operation prior to the final molding step shown in FIG. 1.

To make a block according to the invention there is provided a mould 10 which has the inner surface 11 thereof shaped to the required dimensions of the block to be made. The mould is provided with an external flange 12 around its open, or base, end. Capable of being connected to the mould by bolts or otherwise is a washer-like first disc 13 which has on its inner periphery an upstanding lip 14. The inside diameter of the disc 13 is smaller than the inside diameter of the mould 10, and the outside diameter of the disc 13 and the flange 12 is the same.

A second-washer-like disc 15 is provided, and on the face adapted to be adjacent the disc 13 there are provided a plurality of radial grooves 16 hereinafter referred to. The inside diameter of the disc 15 is just more than the outside diameter of the lip 14 of the disc 13 and the outside diameter of the disc 15 is the same as the disc 13.

Adapted to be located within the mould, when assembled, is a bag or expandable member 17 which can be filled with steam or hot water to cause expansion thereof when the mould is in use (part only of the bag 17 is shown).

In use a layer of fibre glass 18 is placed in the mould so that it covers the whole surface thereof and extends inwardly along the under surface of the disc 13, over the lip 14 and in between the discs 13 and 15, as shown in FIG. 2. Conveniently the disc 15 is removed until the fibre glass is placed in position and then the disc 15 is re-placed and clamped down as shown in FIG. 3. The layer of fibre glass 18 is initially approximately one inch thick. A predetermined quantity of resin binder is placed onto the fibre glass 19 in the bottom of the mould and the bag 17 located in position as shown in FIG. 4. The bag is then expanded by steam or hot water 20, as shown in FIG. 1. This expansion compresses the fibre glass and the heat causes the resin to flow upwardly all through the fibre glass. Air which is in the fibre glass can escape along the radial grooves 16 of the disc 15 and in turn is followed by the surplus resin.

After pressing the fibre glass is allowed to cool and set and can then be removed from the mould as a hard block which has an inwardly extending flange 18a and a spaced away externally projecting flange 18b. The latter flange is removed to leave the block in its finished shape. A suitable core of aluminium can now be located in the space defined by the flange 18a and the block is ready for use.

If the block is intended for use in a blocking process in which steam is used the domed portion thereof is perforated by drilling with a small hand drill.

Blocks made in the above manner are light in weight, cannot be broken by dropping and can withstand temperatures up to 300° F.

I claim:

1. Apparatus for forming hat blocks comprising a mold closed at one end and having an opening at the other end, an outwardly extending flange surrounding said other end, a first washer disk covering said flange and extending partly over said opening and forming a constricted neck for said opening, said first disk being secured to said mold, a second washer disk having a central aperture larger than said neck and overlying said first disk, said disks being spaced apart to receive a moldable mixture, vent grooves in one of said disks, means for clamping said second disk to said first disk and said mold, and an inflatable bag in said mold and overlying said second disk.

2. A method of molding a hat block comprising placing a fibrous material in a mold closed at one end and having an opening at the other end, said mold having a lateral flange surrounding said other end; placing a first washer disk on said flange with said first disk extending partly over said opening and having an inner lip; depositing in said mold a body of said material so that a portion thereof lies on said lip and said first disk; placing a second disk on the portion of said material on said first disk; depositing a resinous binder adapted to be hardened in said mold; placing an inflatable bag within said mold and overlaying said lip and said second disk; introducing a hot fluid under pressure into said bag; and venting air displaced by said pressure between said disks.

3. Apparatus according to claim 1 wherein the inner periphery of said first washer disk has an upstanding lip adapted to permit the overlay of said mixture.

4. Apparatus according to claim 3 wherein the inner edge of said second washer disk terminates short of said lip.

5. A method according to claim 2 characterized in that said resinous binder is introduced into said mold after said fibrous material has been deposited over the inner wall of said mold.

References Cited in the file of this patent
UNITED STATES PATENTS

| | | |
|---|---|---|
| 54,204 | Presbrey | Apr. 24, 1866 |
| 2,456,615 | Berglund | Dec. 21, 1948 |
| 2,480,960 | Press | Sept. 6, 1949 |
| 2,752,635 | Miller | July 3, 1956 |
| 2,891,280 | Politis | June 23, 1959 |